2,955,068

METHOD FOR CONTROLLING BORING SPONGES AND OTHER PESTS OF COMMERCIAL MOLLUSKS

Victor L. Loosanoff, Milford, Conn., assignor to the United States of America as represented by the Secretary of the Interior No Drawing. Filed Oct. 10, 1958, Ser. No. 766,624

20 Claims. (Cl. 167—14)

(Granted under Title 35, U.S. Code (1952), sec. 266)

The invention herein described and claimed may be manufactured and used by or for the Government of the United States of America for governmental purposes without the payment of royalties thereon or therefor.

This invention relates to a method for controlling pests affecting commercially important mollusks.

Ever since commercial cultivation of oysters was undertaken in this country, growers have found that the oyster beds became seriously infested with enemies of the shellfish, which seriously lower the yield and impair their quality. Hard shell clams grown under hatchery conditions are likewise often seriously affected by fouling organisms. In the past various methods have been suggested for controlling shellfish enemies. Recently, effective chemical methods have been devised for the control of undesirable species of crabs, such as green and mud crabs, which are great destroyers of small clams and oysters. A mechanical method for destroying oyster drills by burying them under a thin layer of bottom deposit has been found, experimentally, to be very effective. U.S. Patent 2,181,882 suggests the use of lime to destroy vermin on shellfish beds. This method is very effective against starfish, the lime causing lesions in the delicate membranes, which eventually kills the organism. This method however requires actual physical contact of the solid lime particles with the organism, because of the low solubility of hydrated lime in water, and thus, any pests which are hidden or shielded escape destruction.

Placing infested oysters and cultch in fresh water to kill sponges has also been suggested. This latter method requires a relatively long time for effective operation, and because of the large quantities of fresh water required is impractical. The oyster material would either have to be treated on board ship, where capacity is limited, or be brought to shore for treatment then returned to the sea, which would require a large expenditure of labor and capital. Parenthetically, as used herein "oyster material" refers to oysters and associated cultch.

I have discovered that concentrated solutions of water soluble inorganic salts may be employed effectively to control pests infesting shellfish beds. Sodium chloride is preferred since it is the cheapest and most readily available inorganic salt. However, where circumstances warrant, other salts may be employed, such as potassium chloride, calcium chloride, etc. The method simply, consists in removing the shellfish material from the sea bottom and contacting it with concentrated salt solution for a relatively short period of time, and then returning the shellfish material to the sea bottom. A period of air exposure is preferably included before returning the shellfish material to the water, but the process may be conducted without the air exposure step, if desired. In practice, with oysters, this method involves dredging up the oyster material, treating it either by dipping in the salt solution or spraying, and returning it to the water after a suitable time period.

I have found that a saturated solution of common salt is very effective for the purpose. By keeping an excess of crystalline salt present in the solution, saturation is maintained at all times. There is a danger, where dipping operations are employed, that the solution would become too dilute for effective operation on continued use. The continuous presence of salt crystals in the dipping solution acts to prevent this. Alternatively, the salt solution may be sprayed on the pile of oysters as they are dredged up from their beds. The spraying method is not as effective as the dipping method generally, since usually only one side of the oyster shell is covered by the spray while the other side is untreated, and the pests attached to the untreated side are unaffected. However, by taking care to thoroughly wet the oysters during spraying, as by turning them and spreading them in thin layers, more even salt solution coverage may be obtained.

It is an object, therefore, of this invention to provide a cheap and effective means for controlling pests infesting shellfish beds.

It is a further object of this invention to kill said pests by contacting them with a concentrated salt solution.

A further object of this invention is to kill said pests by contacting them with saturated salt solution.

A further object of this invention is to kill said pests by immersing infested oysters in a saturated salt solution then removing the infested oysters from the solution and allowing them to drain and exposing them to the air for a given time before returning them to the bed.

It is a further object of this invention to kill said shellfish pests by spraying infested oysters with a saturated salt solution, allowing them to drain while exposed to air, and then returning them to the water bed.

A further object of this invention is to increase the efficiency of killing action of the salt solution as regards tunicates, sponges, and flatworms, by adding Victoria blue to the salt solution.

Since oyster farming involves bottom clearing and transplanting operations during which dredged oyster material is placed on the deck of a boat for several hours before returning it to the water, treatment of the material while piled on the deck is probably the most convenient method. The oyster material is dredged up, allowed to drain, and then placed in a tank of saturated salt solution, and allowed to remain there for a time determined by the nature of the pests, and the ambient water and air temperature. After this soaking the oyster material is removed from the tank and piled on the deck of the vessel. When the mechanical ground treating operations are completed, the oysters are returned to sea water. As indicated, spraying may be employed if desired.

The effectiveness of the treatment is based on the sharp change in osmotic pressure within the unprotected bodies of the pests. In the case of starfish, after treatment and return to sea water their bodies soon shrink and become flat, and curling of the tips of the rays, and autotomy or self-mutilization consisting of casting off rays, are frequently observed. The delicate membrane sometimes called "skin gills," covering the starfish body, through which exchange of gases between the body of the water and the surrounding water takes place, disintegrates usually within a few hours after treatment. At a temperature of about 20° C. decomposition of the starfish is often quite advanced at the end of 24 or 36 hours.

In the case of healthy oysters, immersion in a saturated salt solution for 30 minutes at a temperature of 20° C. produces no ill effects. Certain other shellfish species such as small hard clams (*Venus mercenaria*) may be affected by exposure of 15 minutes. However, the difference between the exposure time necessary to kill the shellfish pests and the exposure time adversely affecting the desirable shellfish is sufficient to enable an immersion time to be selected which results in killing the pests and leaving the desirable shellfish unaffected.

In all cases the efficacy of the treatment is affected by the concentration of the salt solution, time and temperature of immersion and time and temperature of air exposure. A longer immersion time is required when the solution is not saturated. A higher solution temperature requires less immersion time, while with other things being equal, a longer solution immersion requires a subsequent lesser air exposure. The time of air exposure also varies with the temperature, a higher temperature lowering the time required. With any given set of conditions a few experiments will determine the optimum mode of operation.

The results of experiments with various oyster enemies are as follows:

Sponges

Among the numerous oyster enemies on the Atlantic Coast the group of boring sponges belonging to the genus Cliona occupies an important position. Although not actually parasitic, the sponges honeycomb the shells of oysters by excavating irregular tunnels. This honeycombing is often so extensive that the shells become brittle and are easily damaged during handling. The unsightly appearance of oysters with shells heavily infested with sponges also lessens their market value. Moreover, the vitality of seriously infested oysters is considerably lowered by continuous efforts to produce large quantities of shell material to close the openings of the burrows made by sponges. Sometimes the shells are disintegrated to such an extent that the oysters are unable to survive.

According to recent studies on distribution and taxonomy of boring sponges there are seven species of the genus Cliona on our Atlantic Coast, of which four—*C. celata, C. lobata, C. vastifica* and *C. truitti*—are found in Long Island Sound. *C. celata* is the most common, causing serious and extensive damage to oysters, especially of older age-groups. It is found from Malpeque Bay, Prince Edward Island, to the Carolinas, and also along the coasts of Europe.

In several tests 100 percent mortality of sponges was caused by immersing them in a saturated salt solution for only 30 seconds and then leaving them exposed to air for at least one hour. In other tests, however, some of the colonies survived this treatment. Nevertheless, practically all sponges were killed if immersed in a saturated solution for three minutes and then kept in air for one hour. Somewhat longer exposures may be needed to achieve a 100 percent kill under other conditions, but in most instances 10 minutes of immersion and one hour of air exposure is sufficient. By prolonging the exposure to air the immersion period may be decreased.

The differences in the resistance of sponges to the treatment may be due to their physiological condition, thickness of the oyster shells they infest, and the temperature at which they are dipped in the salt solution. In the summer, when the temperatures are high, death and disintegration of sponges, manifested by a change in color from yellow to grayish-black, can usually be observed with 24 to 36 hours after the treatment.

Starfish

It was found that immersion of starfish in a saturated salt solution is an even better method than sprinkling lime over the dredged oyster material while it is on the deck of the boat. The advantage of this method is that all starfish, even those hidden in such places as empty conch shells, will be reached by the solution, something that cannot be accomplished by sprinkling lime.

Experiments have shown that even those starfish that were immersed in the saturated salt solution for only 30 seconds and then returned immediately to sea water died in the majority of cases. One minute of immersion especially if the starfish were then kept on deck for some time before they were returned to sea water, caused 100 percent mortality, regardless of the size of the starfish.

Since the use of a salt solution is cheaper, safer and easier, my method can be advantageously substituted for the current practice of dipping mops with entangled starfish in hot water. Moreover, because starfish killed by immersion in a salt solution become soft and flabby almost immediately after treatment, they will rapidly disintegrate and fall out of the mop.

Crepidula

Crepidula is not a direct enemy but a competitor of oysters that often deprives them, especially young ones, of space and food. These snail-like animals, commonly called "slipper limpets" or "quarter-decks," become so numerous at times that they virtually smother beds of oysters. The most common form of Crepidula in Connecticut and New York waters is *C. fornicata*, and the next is *C. plana*. *C. fornicata* usually forms "chains," consisting of groups of several individuals attached to each other.

The setting period of Crepidula coincides to a large extent with that of oysters, but because young Crepidula increase in size much more rapidly than does oyster set, they quickly overgrow the latter, often covering the young oysters with their own bodies. As many as 20 recently set oysters have been counted under the body of a single Crepidula.

The salt method is effective in controlling both species of Crepidula. Immersion of Crepidula "chains" in a saturated salt solution for only 30 seconds and then keeping them in air for an additional 30 minutes was found sufficient to break the "chains" and separate the individuals many of which had been seriously injured.

By immersing Crepidula in a salt solution for three to five minutes, and then keeping them on deck for 30 to 60 minutes, complete disintegration of the "chains" was usually achieved and the snails were so strongly affected that they all died by the fifth day after return to seat water. The water temperature in these tests varies between 18.0° and 21.0° C.

Tunicates

Still another competitor of oysters and several other commercial mollusks is the common marine form known as the tunicate. There are numerous species of these pests along the Atlantic Coast. *Molgula manhattensis* being especially common in the Long Island Sound area. During a part of the year this and closely related forms, commonly called "sea grapes," are among the chief fouling organisms virtually covering all types of spat collectors placed in shallow water. In addition to competing for space with mollusks, tunicates also deprive them of food.

It has been found that tunicates can be seriously injured by immersing them in a saturated salt solution for only 30 seconds and then keeping them in air for another hour. Approximately 80 percent mortality can be effected in this way. A total kill may be achieved by a one- to three-minute immersion followed by one hour of air exposure.

If tunicates have to be thrown overboard immediately after treatment, at least a 10-minute immersion is necessary to cause approximately 100 percent mortality. It has been noticed that small, young tunicates are more resistant to the salt treatment than large ones.

Oyster drills

Saturated salt solution can also be helpful in controlling drill populations of the two species, *Urosalpinx cinerea* and *Eupleura caudata*, by killing their eggs and embryos while still in egg cases. Heavy mortality was observed even when egg cases containing developing drills were immersed for only three minutes in a saturated salt solution and then kept in air for several additional hours before being returned to running sea water. Immersion for five minutes caused considerable, sometimes complete mortality even if the embryos were returned to sea water immediately after treatment.

Other organisms

Flatworms of the genus *Pseudo stylochus* and the related species *Stylochus ellipticus* which attack young oysters and oyster set have been killed with concentrated salt solutions. In addition, other fouling organisms which infest oysters and cultch, such as protozoa, hydroids, bryozoa, algae, and small crustaceans can be killed by the salt solution.

The efficiency of the salt solution in some cases may be increased by adding various chemicals which have the effect of causing the organisms to pump faster. Victoria blue, phenyl-tetramethyltriamide-$\alpha$-naphthyldiphenyl-carbinol hydrochloride, for example, increases the effectiveness of the method with sponges, tunicates, and flatworms.

Obviously, many modifications and variations of the invention as hereinbefore set forth may be made without departing from the spirit and scope thereof, and only such limitations are to be imposed as are indicated in the appended claims.

I claim:
1. A method for killing pests infesting shellfish beds which comprises the step of immersing said pests in a concentrated salt solution, said salt being a member of the class consisting of the chlorides of sodium, potassium and calcium.
2. The method of claim 1, wherein the solution is saturated.
3. The method of claim 1, wherein the salt is sodium chloride.
4. A method for killing pests infesting shellfish beds which comprises the steps of immersing said pests in a concentrated salt solution for a relatively short time interval, said salt being a member of the class consisting of the chlorides of sodium, potassium and calcium, removing them from the solution and exposing them to air.
5. The method of claim 4, wherein the solution is saturated.
6. The method of claim 4, wherein the salt is sodium chloride.
7. A method for the control of shellfish pests infesting shellfish beds, including starfish, Crepidula, tunicates, oyster drills, and flatworms, individually and in combination, which comprises the steps of removing shellfish material from its bed and soaking said material with a concentrated salt solution for a relatively short time interval, said salt being a member of the class consisting of the chlorides of sodium, potassium and calcium.
8. The method of claim 7, wherein the shellfish are oysters.
9. The method of claim 8, wherein the solution is saturated.
10. The method of claim 8, wherein the salt is sodium chloride.
11. The method of claim 8, wherein the oyster material is soaked by spraying with saturated salt solution.
12. A method for the control of pests infesting shellfish beds, said pests including starfish, Crepidula, tunicates, oyster drills and flatworms, individually and in combination, which comprises the steps of removing shellfish material from the bed, soaking said material with a concentrated salt solution for a relatively short time interval, said salt being a member of the class consisting of the chlorides of sodium, potassium and calcium, removing the said material from the salt solution, exposing said material to air, and returning said shellfish material to a bedding locale.
13. The method of claim 12, wherein the shellfish are oysters.
14. The method of claim 13, wherein the solution is saturated.
15. The method of claim 13, wherein the salt is sodium chloride.
16. The method of claim 13, wherein the oyster material is immersed in the saturated salt solution.
17. The method of claim 13, wherein the oyster material is soaked by spraying with saturated salt solution.
18. A method for killing sponges, tunicates, and flatworms, individually and in combination, by thoroughly wetting them with a concentrated salt solution containing Victoria blue, said salt being a member of the class consisting of the chlorides of sodium, potassium and calcium.
19. A method for killing pests infesting shellfish beds, including tunicates, sponges, and flatworms, individually and in combination, which comprises the step of removing the shellfish material from the bed, soaking said material with a saturated salt solution containing Victoria blue, said salt being a member of the class consisting of the chlorides of sodium, potassium and calcium, and returning said shell fish material to a bedding locale.
20. The method of claim 19, wherein the salt is sodium chloride.

References Cited in the file of this patent

UNITED STATES PATENTS 2,738,325    Rydell _____ Mar. 13, 1956

OTHER REFERENCES

McMullen: Jour. of Parasit., vol. 34, sec. 2 Supp. (December 1948), p. 33.
Berry et al.: Public Health Reports, vol. 65 (1950), pp. 939–949.
Chem. and Eng. News, vol. 34, No. 24, June 11, 1956, p. 2884.
Palmer: Ohio J. of Science, vol. LV, No. 1, January 1955, pp. 1–8 (pp. 1 and 3 relied on).
Chander: J. Agr. Res., vol. 20, No. 3, November 1, 1920, pp. 193–208 (pp. 193–197 relied on).
Mozeley: Control of Bilharzia in So. Rhodesia (1944), pp. 223, 236.
Frear: A Catalogue of Insecticides and Fungicides, Chronica Botanica Co., vol. I, 1948, pp. 126, 149.